(12) United States Patent
Kozlovsky et al.

(10) Patent No.: US 10,359,934 B2
(45) Date of Patent: Jul. 23, 2019

(54) METHOD AND APPARATUS FOR IT APPLIANCE CONTROL

(71) Applicant: EMC IP Holding Company LLC, Hopkinton, MA (US)

(72) Inventors: Vitaly Kozlovsky, Saint Petersburg (RU); Inga Petryaevskaya, Saint Petersburg (RU); Yuri Zagrebin, Saint Petersburg (RU); Konstantin Tyapochkin, Saint Petersburg (RU); Alexey Fomin, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 15/318,111

(22) PCT Filed: Dec. 30, 2014

(86) PCT No.: PCT/RU2014/001015
§ 371 (c)(1),
(2) Date: Dec. 12, 2016

(87) PCT Pub. No.: WO2016/108718
PCT Pub. Date: Jul. 7, 2016

(65) Prior Publication Data
US 2017/0139599 A1    May 18, 2017

(30) Foreign Application Priority Data
Dec. 30, 2014   (WO) ................ PCT/RU2014/001015

(51) Int. Cl.
G06F 3/06        (2006.01)
G06Q 10/08       (2012.01)
G06K 7/14        (2006.01)

(52) U.S. Cl.
CPC ............ *G06F 3/0604* (2013.01); *G06F 3/067* (2013.01); *G06F 3/0631* (2013.01); *G06K 7/1417* (2013.01); *G06Q 10/087* (2013.01)

(58) Field of Classification Search
CPC ....... G06F 3/0604; G06F 3/0631; G06F 3/067
(Continued)

(56) References Cited

U.S. PATENT DOCUMENTS 5,732,271 A * 3/1998 Berry .................... G06F 9/4492
                                                         719/316
8,209,356 B1 * 6/2012 Roesler ............... G06F 9/45512
                                                         707/802
(Continued)

FOREIGN PATENT DOCUMENTS

DE    102011107839    1/2013
EP    1764321         3/2007

OTHER PUBLICATIONS

International Search Report and Written Opinion of the International Searching Authority for International Application No. PCT/RU2014/001015, dated Sep. 25, 2015, 9 pages.

*Primary Examiner* — Tuan V Thai
(74) *Attorney, Agent, or Firm* — Ryan, Mason & Lewis, LLP

(57) ABSTRACT

Example embodiments of the present invention relate to a method, an apparatus, and a computer program product for IT appliance control. The method comprises determining an action regarding a storage system, encoding the action regarding the storage system, and representing the action regarding the storage system as a graphical representation.

21 Claims, 7 Drawing Sheets

(58) Field of Classification Search
USPC .......................................... 711/100, 154, 170
See application file for complete search history.

(56) References Cited

U.S. PATENT DOCUMENTS

| | | | |
|---|---|---|---|
| 2003/0079019 A1* | 4/2003 | Lolayekar | H04L 67/1097 709/226 |
| 2007/0027964 A1* | 2/2007 | Herrod | H04L 41/0806 709/220 |
| 2011/0226850 A1* | 9/2011 | Ungos | G06F 3/002 235/375 |
| 2012/0125992 A1* | 5/2012 | Nakagawa | G06Q 50/10 235/375 |
| 2013/0233916 A1 | 9/2013 | Tran | |
| 2013/0268639 A1* | 10/2013 | Myrah | G06F 8/76 709/221 |
| 2014/0097239 A1 | 4/2014 | Bayliff et al. | |
| 2014/0239057 A1* | 8/2014 | Galvin, Jr. | H04M 1/72566 235/375 |

* cited by examiner

METHOD AND APPARATUS FOR IT APPLIANCE CONTROL

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This application is related to U.S. Pat. No. 8,782,341 entitled "EMBEDDED ADVISORY FRAMEWORK FOR STORAGE CONFIGURATION MANAGEMENT" issued on Jul. 15, 2014 and U.S. patent application Ser. No. 13/804,596 entitled "OPTIMAL DATA STORAGE CONFIGURATION" filed on Mar. 14, 2013; Ser. No. 13/813,825 entitled "RETRIEVING DATA FROM DATA STORAGE SYSTEMS" filed on Feb. 1, 2013; and Ser. No. 14/137,448 entitled "TIERED STORAGE DESIGN" filed on Dec. 20, 2013, the teachings of which are hereby incorporated herein by reference in their entirety.

TECHNICAL FIELD

This application relates to data storage and, more specifically, to automation of the service commands for data storage management.

BACKGROUND

Some data storage systems include complex arrangements of storage disk arrays, configuration management interfaces, and storage processors. A system administrator faces many choices in making adjustments to the configuration of a data storage system in response to changing conditions, many of them resulting in suboptimal performance. Along these lines, the system administrator may seek advice with regard to provisioning additional storage when a storage processor generates an alert that the available storage on a particular storage disk array has fallen below a threshold.

Conventional configuration advisory tools for data storage systems use standalone applications that employ a set of heuristics based on historical configuration and failure event data. Along these lines, suppose that a data storage system needs to be configured to support a certain quantum of work of a given characteristic (called a "workload"). A system administrator will either contact a support center, which will use a standalone tool, or use a standalone tool himself. The tool will take the input characteristics of the workload, and consulting the set of heuristics that it is supplied with, will provide advice on how to configure the data storage system.

SUMMARY

Example embodiments of the present invention relate to a method, an apparatus, and a computer program product for IT appliance control. The method comprises determining an action regarding a storage system, encoding the action regarding the storage system, and representing the action regarding the storage system as a graphical representation.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Example embodiments of the present invention relate to automation of service commands which, in certain embodiments, enables executing them quickly and performing hardware management and maintenance in a more convenient way. For example, example embodiments of the present invention may minimize efforts on initial system configuration and maintenance during the hardware life time, reshape complex systems as simple and easy to use by masking the complexity of many management actions under an automated control framework, and enable "Storage Control Automation" to be offered as a premium service to customers.

Although the description below describes use of example embodiments of the present invention with VNX® storage systems by EMC Corporation of Hopkinton, Mass., it should be understood that example embodiments of the present invention may relate to different kinds of information technology (IT) appliances, for example, storage systems (e.g., storage arrays), general purpose servers, commodity hardware, network switches, routers, personal computers (PCs); and home equipment, for example, smart TVs, refrigerators, and other appliances. It should be understood that example embodiments of the present invention may be applied to variety of hardware which has a central processing unit (CPU), random access memory (RAM), and at least one interface port for service purposes.

Typically, storage systems require maintenance work to be performed by service engineers. This may include tuning of some internal parameters like redundant array of independent disk (RAID) configuration, logical unit (LUN) allocation, data collection routines, statistics gathering, settings reset, or any other anonymous or authorized commands. In general, however, the storage system does not have keyboard and monitor attached so a remote user graphical user interface (GUI) or command line interface (CLI) is used to access the system. This provides an added layer of complexity and, in the case of an inability to access the storage system via the GUI or the CLI (e.g., if a network card is broken or because of a driver failure), there is no way to execute system commands without connection of additional equipment (e.g., keyboard and monitor). In many cases, this requires significant effort to perform what should be a simple command (i.e., system or service reset, log collection, etc.). In other cases, some sequence of complex system scripts may need to be run but a qualified service technician may not be reachable or additional hardware may not be available. Therefore, what is needed is a more simple and reliable way to execute commands with minimal user requirements.

Figure 1:
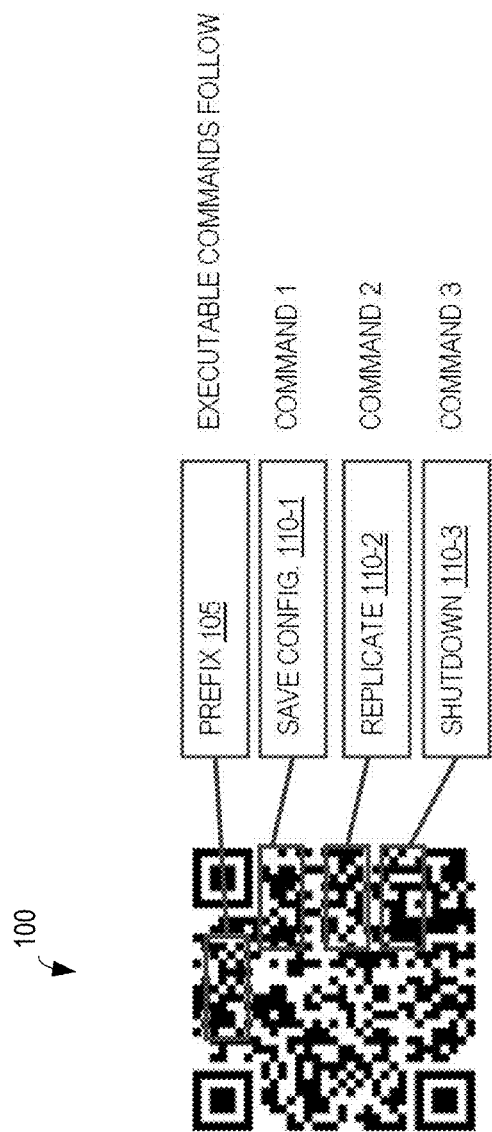
FIG. 1 is a diagram illustrating a matrix barcode according to an example embodiment of the present invention.

FIG. 1 is a diagram illustrating a matrix barcode 100 (e.g., a quick response code or QR Code® by Denso Wave Incorporated of Tokyo, Japan). Matrix barcodes are described in U.S. Pat. No. 5,726,435 entitled "OPTICALLY READABLE TWO-DIMENSIONAL CODE AND METHOD AND APPARATUS USING THE SAME" issued on Mar. 10, 1998; U.S. Pat. No. 5,691,527 entitled "TWO DIMENSIONAL CODE READING APPARATUS" issued on Nov. 25, 1997; and U.S. Pat. No. 7,032,823 entitled "TWO-DIMENSIONAL CODE, METHODS AND APPARATUSES FOR GENERATING, DISPLAYING AND READING THE SAME" issued on Apr. 25, 2006, the teachings of which are hereby incorporated herein by reference in their entirety. A matrix barcode is a machine-readable optical label that contains information, such as information about an item to which it is affixed. A QR Code may use four standard encoding modes (i.e., numeric, alphanumeric, byte/binary, and kanji) to store data.

As illustrated in FIG. 1, the matrix barcode 100 may represent encoding of information, such as a prefix 105 and a plurality of commands 110 (e.g., save 110-1, replicate 110-2, and shutdown 110-3). For example, the prefix 105 may indicate to a device reading the matrix barcode 100 that one or more executable commands 110 follows.

Figure 5A:
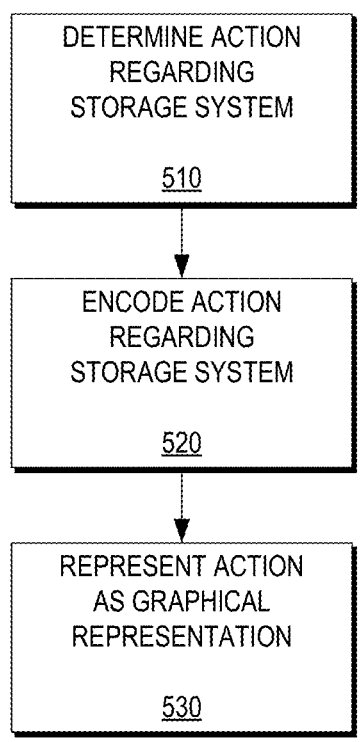
FIGS. 5A-5B are flow diagrams illustrating methods according to respective example embodiments of the present invention.

FIG. 1 may be studied in conjunction with FIG. 5A which is a flow diagram illustrating a method according to an example embodiment of the present invention. As illustrated in FIGS. 1 and 5A, to create a matrix barcode 100, example embodiments of the present invention may determine an action 110 regarding a storage system to be represented in the matrix barcode (510) and encode the action 110 regarding the storage system (520). The encoded action 110 regarding the storage system then may be represented as a graphical representation (530), such as the matrix barcode 100.

Figure 5B:
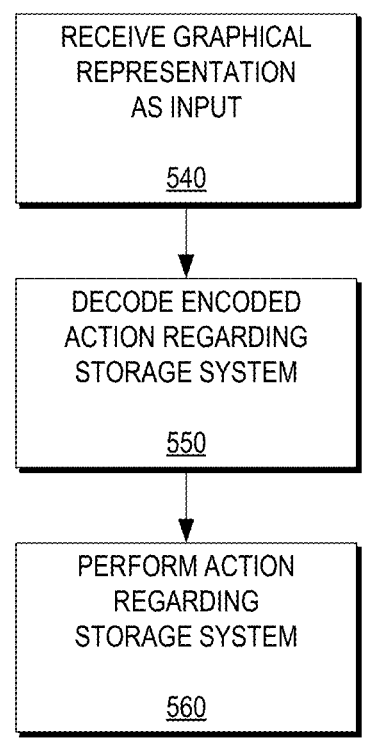

As illustrated in FIGS. 1 and 5B, to use a matrix barcode 100 for automation of storage management, example embodiments of the present invention may receive the graphical representation (e.g., matrix barcode 100) of the action regarding the storage system as an input (540) and decode the encoded action 110 regarding the storage system represented by the graphical representation (550). The decoded action 110 regarding the storage system then may be performed (560).

In certain embodiments, a hardware device (e.g., scanner or optical device such as a mobile phone) may interface with the storage system (e.g., universal serial bus (USB), local area network (LAN), or communications (COM) port). In certain embodiments, a driver for the hardware device may recognize the scanned matrix barcode 100, identify command 110 markers in the matrix barcode 100, and execute them on the storage system.

For example, in certain embodiments, the one or more storage system commands may be encoded as a binary set of instructions, with a software library used to represent the binary-encoded storage system commands as a series of black squares comprising the matrix barcode 100. The storage system commands 110 may be a number of frequently used/important commands or sequences which may be interpreted by, for example, a system CLI (e.g., Linux commands or scripts, such as reboot, reconfigured, shutdown, start replication, format, etc.). In other words, usage of storage system commands 110 encoded in a matrix barcode 100 abstracts away the knowledge of system commands used in, for example, GUIs and CLIs from service personnel who actually run the storage system commands 110. Accordingly, example embodiments of the present invention enable masking of storage system commands 110 by encoding them in a machine-readable form.

Further, in certain embodiments, the binary set of instructions may be encrypted prior to representation as a matrix barcode such that the encrypted binary-encoded storage system commands are then represented as a series of black squares comprising the matrix barcode. Therefore, although matrix barcodes generally comply with one or more standards, the encrypted binary-encoded storage system commands may provide a limit on those that have the ability to read the storage system commands to only those that are able to decrypt or otherwise transform the output of reading the matrix barcode 100.

In other embodiments, the information stored in the matrix barcode may be a pointer to an external location. In certain embodiments, the external location may be a secure location requiring credentials for retrieval of the storage system commands. Additional security layers may be provided by requiring authentication of a user scanning the matrix barcode 100, such as by scanning a second matrix barcode identifying the user (e.g., printed on a personnel badge), with the second matrix barcode authenticating the identity of the user and authorizing the user to perform the one or more operations encoded in the matrix barcode 100.

Figure 2:
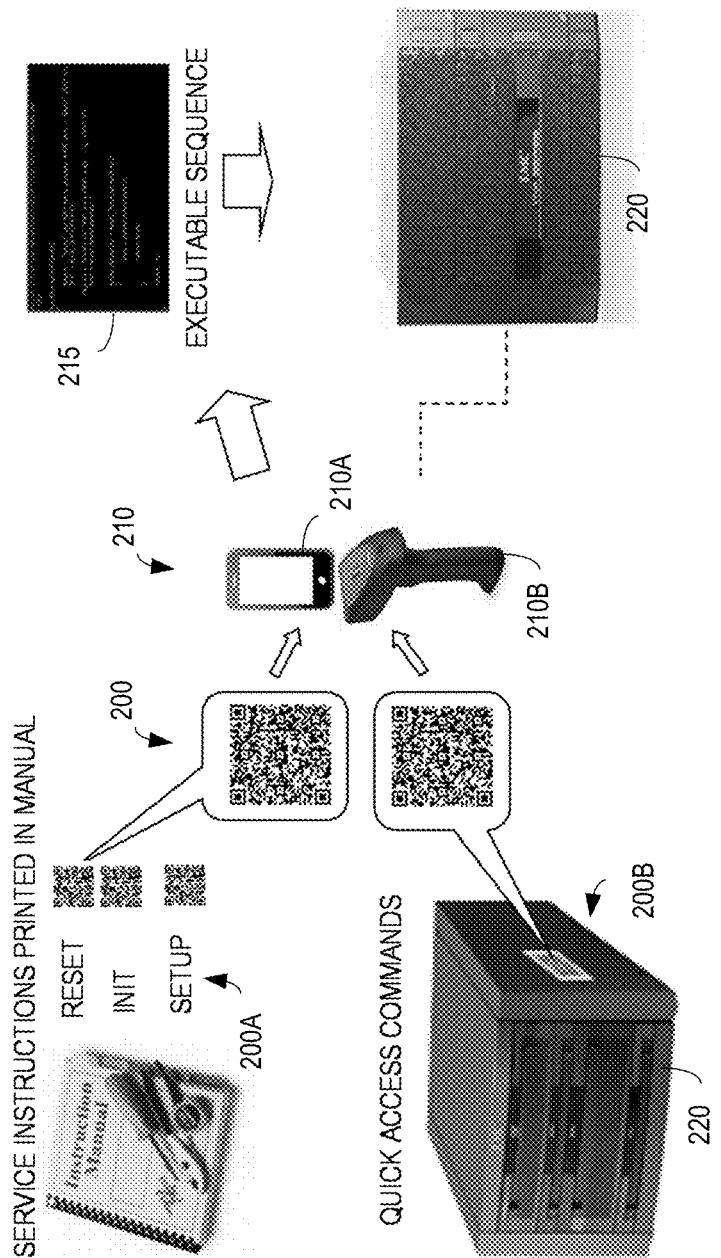
FIG. 2 is a process diagram illustrating a method for command execution on a storage array according to respective example embodiments of the present invention.

FIG. 2 is a process diagram illustrating a method for command execution on a storage array according to respective example embodiments of the present invention. As illustrated in FIG. 2, example embodiments of the present invention enable quick and reliable system command execution on, for example, storage systems 220 which have no access via a common user interface (e.g., GUI or CLI). As a result of example embodiments of the present invention, even non-qualified personnel may perform control actions on storage systems 220. Another benefit provided by example embodiments of the present invention they enable performance of pre-programmed service operations (e.g., cleanup or reboot). Accordingly, example embodiments of the present invention enable performance of storage system services that significantly conserves resources and time.

As illustrated in FIG. 2, in alternate embodiments, matrix barcodes 200 may be provided in user documentation 200A (or, alternatively, in any other printed form, such as a digital image transmitted via e-mail) or on the chassis 200B (200 generally) of the storage system 220. Similarly, as illustrated in FIG. 2, in alternate embodiments, example embodiments of the present invention do not require use of specific hardware to read the matrix barcode 200; rather, for example, a mobile phone 210A (or any other mobile device capable of scanning matrix barcodes using, for example, a matrix barcode scanning app) or a traditional barcode scanner 210B (210 generally) may be used to read the matrix barcode 200.

Therefore, as illustrated in FIG. 2, a user (not shown) may use matrix barcode scanning device 210 to scan a matrix barcode 200 encoded with storage system commands (e.g., storage system commands 110 of FIG. 1) to generate an executable sequence 215 of storage system commands that may be executed on the storage system 220. As illustrated in FIG. 2, the executable sequence 215 of storage system commands may be interpreted by a CLI; however, in alternate embodiments, the executable sequence 215 of storage system commands may be interpreted by a GUI or an application programming interface (API) for execution on the storage system 220.

Figure 3:
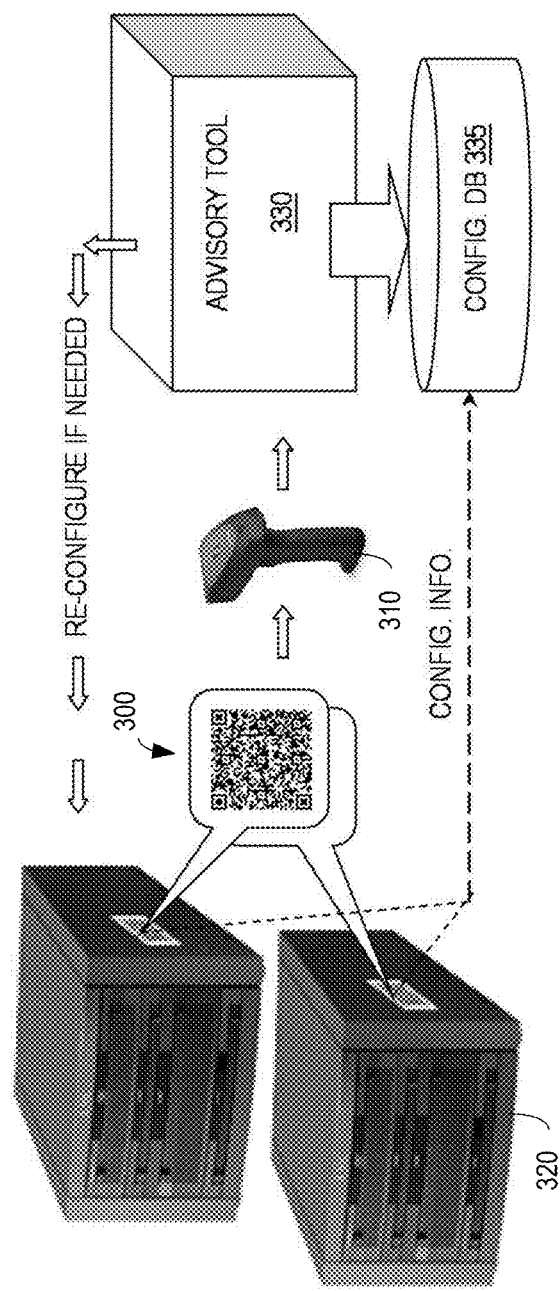
FIG. 3 is a process diagram illustrating a method for storing and retrieving storage array configuration according to an example embodiment of the present invention.

FIG. 3 is a process diagram illustrating a method for storing and retrieving storage system configuration according to an example embodiment of the present invention. Some data storage systems include complex arrangements of storage disk arrays, configuration management interfaces, and storage processors. Accordingly, these storage systems require configuration (e.g., pools, tiers, RAIDs, LUNs to be composed, and loads assigned). As illustrated in FIG. 3, example embodiments of the present invention may simplify work of users who need to retrieve storage system configuration information (e.g., model, capacity, memory, number of drives, LAN interfaces, etc.). Alternatively, example embodiments of the present invention simplify inventory and identification of storage systems (and other devices) in labs.

Advisory tools 330 are software applications which are widely used by sales and engineers to simplify the choice of the hardware and software configurations based on desired values. Input into an advisory tool 330 may include parameters (e.g., number of users, kind of applications that the storage system is targeted to serve, capacity, and power consumption). Typically, such advisory tools 330 are standalone applications that use databases 335 of the existing hardware and known average parameters of user applications to make final configuration choices. Advisory tools 330 are described in greater detail in U.S. Pat. No. 8,782,341 entitled "EMBEDDED ADVISORY FRAMEWORK FOR STORAGE CONFIGURATION MANAGEMENT" issued on Jul. 15, 2014 and commonly assigned with the present invention to EMC Corporation of Hopkinton, Mass., the teachings of which are herein incorporated by reference in their entirety.

One such advisory tool 330 is VNXSizer by EMC Corporation of Hopkinton, Mass. In general, VNXSizer provides capacity/performance sizing capabilities for VNX® and VNXe® by EMC Corporation of Hopkinton, Mass. (similar to the capabilities of VMAXSizer by EMC Corporation of Hopkinton, Mass. for VMAX® storage systems by EMC Corporation of Hopkinton, Mass.). In general, VNXSizer may be used by sales and pre-sales staff, channel partners, marketing, developers, testers, and administrators to determine a hardware configuration (e.g., model, disks, specific features) and workload allocation in an optimal manner according to given workload and application specifics (e.g., Exchange, Oracle, VDI, file share, hardware model, preferred drives, etc.).

Advisory tools 330, such as VNXSizer, may generate a physical configuration report identifying a storage system (e.g., system type, such as VNX5800), software version, IOPS, percent system utilization, power consumption, total storage, rack unit usage, drive count, number of hot spares, number of vault drives, and risk profile. Advisory tools 330 also may generate a table identifying storage pools, including pool ID, storage tier description (including RAID level), pool type, pool options, disk count, pool storage capacity, percent pool utilization, percent tier drive saturation, and pool response time. This configuration information may be stored in a configuration database 335 or may be represented in a specifically-formatted human-readable or binary file.

For example, on a working storage system, its current configuration details, model, physical hardware available, and internal logical assignments may be viewed remotely or via a special system control panel connected to the rack for the storage system. This supposes usage of specific software for configuration management and control. In some cases, this might be needed for a user to know what sits inside the rack without even connecting to its control panel.

As illustrated in FIG. 3, in an example embodiment of the present invention, a matrix barcode 300 may be created which contains the information about the current configuration of the storage system 320. In certain embodiments, this may be the full content of an advisory tool 330 output including workload information or, in other embodiment, may include only the information regarding the hardware configuration. It is understood in the art that typical matrix barcodes 300 are able to store 4-7 Kbytes which is sufficient to store this type of information. In certain embodiments, a printed matrix barcode 300 may be placed on a human accessible side of the storage system 320 for scanning and determination of storage system 320 configuration information.

The matrix barcode scanner 310 may be communicatively attached to an advisory tool 330 input and, once the matrix barcode 300 is scanned, the storage system configuration information may be restored in the advisory tool 330 and stored in a configuration database 335. In certain embodiments, if the storage system configuration was changed (e.g., new disks were added) the matrix barcode 300 may be replaced by an updated accurate matrix barcode (not shown).

It should be understood that matrix barcode 300 also may be used for asset identification and accounting, whereby an administrator scans the matrix barcode 300 and add the hardware description provided by the matrix barcode 300 to a list of assets. In certain embodiments, the matrix barcode 300 may be provided by a vendor and shipped to a customer with the matrix barcode 300 in place. Additionally, in other embodiments, configuration description information read from the matrix barcode 300 may be transmitted to another location (e.g., for reporting, duplication, and estimation), other customers, or back to a manufacturer for service. It should be noted that in each of these example embodiments storage configuration information regarding the storage system 320 may be retrieved via the matrix barcode 300 without software access (i.e., if the storage system 320 is turned off, damaged, or otherwise inaccessible via a software interface).

Figure 4:
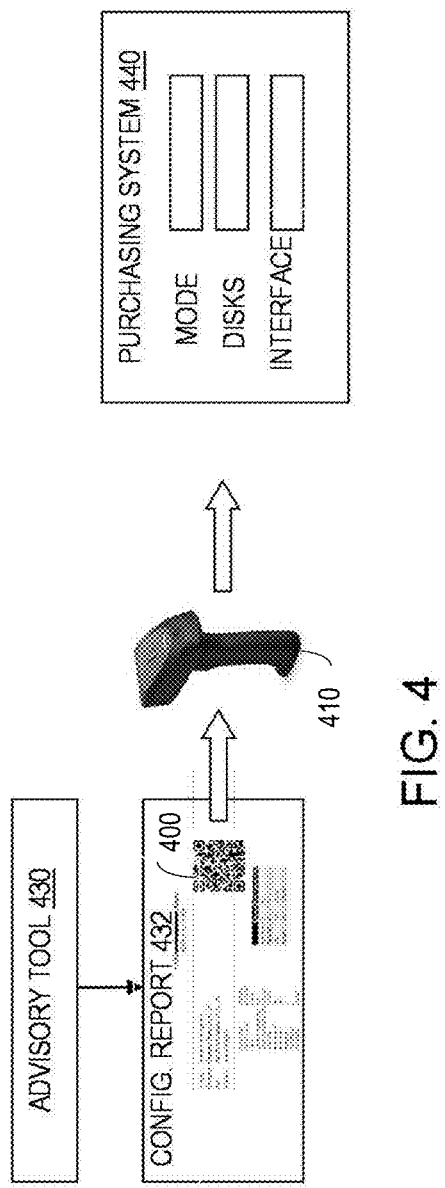
FIG. 4 is a process diagram illustrating a method for storing and retrieving storage array configuration for online purchasing according to an example embodiment of the present invention.

FIG. 4 is a process diagram illustrating a method for storing and retrieving storage array configuration for online purchasing according to an example embodiment of the present invention. In general, many customers and storage system manufacturers desire to have automated systems that provide analysis of storage system configuration (i.e., hardware and software). However, such automated systems must determine whether a proposed storage system are sufficient to satisfy desired customer applications without "overprovisioning", thereby increasing customer cost. Traditionally, advisory tools (e.g., VNXSizer) provide an output that may be entered manually as an order which has a number of disadvantages, including delays in entering/verifying the order, risk of mistake, cost of expert sales personnel, etc.

Accordingly, in example embodiments of the present invention, an advisory tool 430 output (e.g., from VNXSizer) may be encoded in a matrix barcode 400 and represented alongside the human-readable advisory tool 430 output configuration report 432. The matrix barcode 400 then may be scanned by a matrix barcode reader 410 and used for a number of purposes, including automation of form filling in a purchasing system 440. Additionally, the details of the configuration report 432 may be shared with other users or preserved in a configuration database (e.g., configuration database 335 of FIG. 3).

Figure 6:
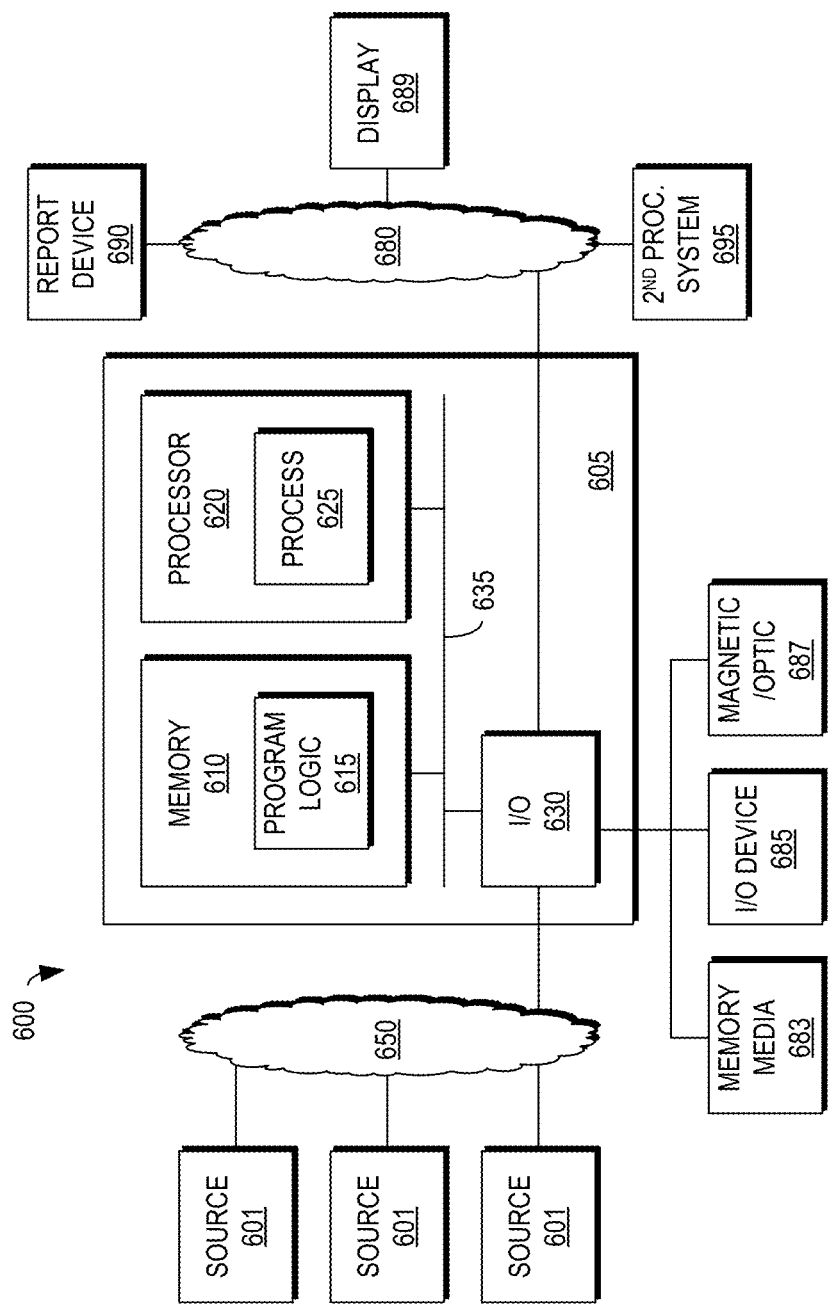
FIG. 6 is a block diagram of an apparatus according to an example embodiment of the present invention.

FIG. 6 is a block diagram of an example embodiment apparatus 605 according to the present invention. The apparatus 605 may be part of a system 600 and includes memory 610 storing program logic 615, a processor 620 for executing a process 625, and a communications I/O interface 630, connected via a bus 635. The system 600 is configured to communicate with a plurality of sources 601 via a network 650 using the I/O interface 630. The computer system 600 is further configured to communicate with a display 689, a report device 690, and a second processing system 695 via a network 680 using the one or more I/O interfaces 630.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 7:
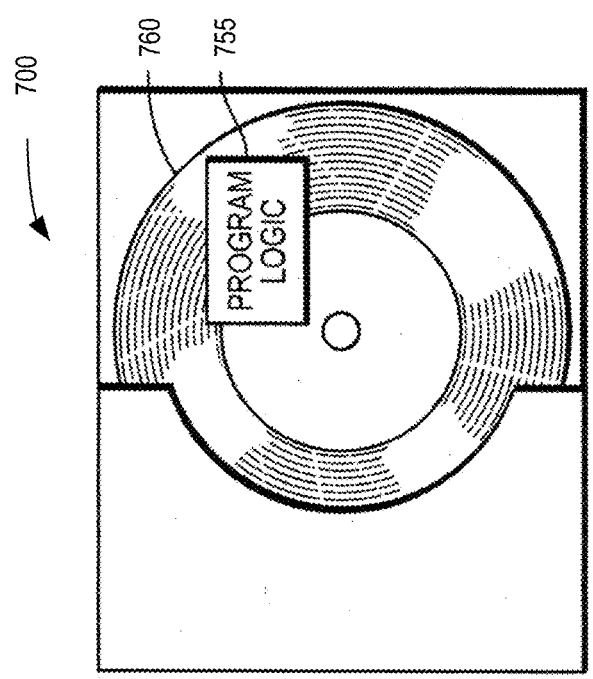
FIG. 7 is an illustration of an example embodiment of the present invention embodied in computer program code.

FIG. 7 is a block diagram of a computer program product 700 including program logic 755, encoded on a computer-readable medium 760 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
   determining an action regarding a storage system, wherein the action is related to ongoing maintenance of the storage system;
   encoding the action regarding the storage system;
   representing the action regarding the storage system as a graphical representation;
   receiving the graphical representation of the action regarding the storage system as an input;
   decoding the encoded action regarding the storage system represented by the graphical representation; and
   performing the action regarding the storage system;
   wherein determining the action regarding the storage system comprises determining a configuration of the storage system;
   wherein encoding the action regarding the storage system comprises encoding the configuration of the storage system;
   wherein representing the action regarding the storage system as the graphical representation comprises representing the configuration of the storage system as a graphical representation;
   wherein receiving the graphical representation of the action regarding the storage system as the input comprises receiving the graphical representation of the configuration of the storage system as an input;
   wherein decoding the encoded action regarding the storage system represented by the graphical representation comprises decoding the encoded configuration of the storage system represented by the graphical representation; and
   wherein performing the action regarding the storage system comprises inputting the configuration of the storage system into a purchasing system.

2. The method of claim 1
   wherein determining the action regarding the storage system comprises determining a storage system command for performing on the storage system;
   wherein encoding the action regarding the storage system comprises encoding the storage system command for performing on the storage system;
   wherein representing the action regarding the storage system as the graphical representation comprises representing the storage system command as a graphical representation;
   wherein receiving the graphical representation of the action regarding the storage system as the input comprises receiving the graphical representation of the storage system command as an input;
   wherein decoding the encoded action regarding the storage system represented by the graphical representation comprises decoding the encoded storage system command represented by the graphical representation; and
   wherein performing the action regarding the storage system comprises performing the storage system command on the storage system.

3. The method of claim 2
   wherein decoding the encoded storage system command represented by the graphical representation generates an executable sequence of one or more storage system commands; and wherein performing the storage system command on the storage system comprises receiving the executable sequence of one or more storage system commands via a management interface to the storage system.

4. The method of claim 1
wherein determining the action regarding the storage system comprises determining a configuration of the storage system;
wherein encoding the action regarding the storage system comprises encoding the configuration of the storage system;
wherein representing the action regarding the storage system as the graphical representation comprises representing the configuration of the storage system as a graphical representation;
wherein receiving the graphical representation of the action regarding the storage system as the input comprises receiving the graphical representation of the configuration of the storage system as an input;
wherein decoding the encoded action regarding the storage system represented by the graphical representation comprises decoding the encoded configuration of the storage system represented by the graphical representation; and
wherein performing the action regarding the storage system comprises configuring the storage system according to the configuration of the storage system.

5. The method of claim 4 wherein the configuration of the storage system is generated by an advisory tool configured to provide one or more of capacity and performance capabilities for the storage system.

6. The method of claim 1 wherein the graphical representation is a matrix barcode.

7. The method of claim 1 wherein encoding the action regarding the storage system comprises encrypting the action regarding the storage system.

8. The method of claim 1 wherein encoding the action regarding the storage system comprises encoding a pointer to an external storage location storing the action regarding the storage system.

9. The method of claim 1 wherein performing the action regarding the storage system comprises inputting the configuration of the storage system into a form of an online purchasing system.

10. An apparatus comprising:
a memory;
a processor; and
computer program code that when executed on the processor causes the apparatus to perform the operations of:
  determining an action regarding a storage system, wherein the action is related to ongoing maintenance of the storage system;
  encoding the action regarding the storage system;
  representing the action regarding the storage system as a graphical representation;
  receiving the graphical representation of the action regarding the storage system as an input;
  decoding the encoded action regarding the storage system represented by the graphical representation; and
  performing the action regarding the storage system;
wherein determining the action regarding the storage system comprises determining a configuration of the storage system;
wherein encoding the action regarding the storage system comprises encoding the configuration of the storage system;
wherein representing the action regarding the storage system as the graphical representation comprises representing the configuration of the storage system as a graphical representation;
wherein receiving the graphical representation of the action regarding the storage system as the input comprises receiving the graphical representation of the configuration of the storage system as an input;
wherein decoding the encoded action regarding the storage system represented by the graphical representation comprises decoding the encoded configuration of the storage system represented by the graphical representation; and
wherein performing the action regarding the storage system comprises inputting the configuration of the storage system into a purchasing system.

11. The apparatus of claim 10
wherein determining the action regarding the storage system comprises determining a storage system command for performing on the storage system;
wherein encoding the action regarding the storage system comprises encoding the storage system command for performing on the storage system;
wherein representing the action regarding the storage system as the graphical representation comprises representing the storage system command as a graphical representation;
wherein receiving the graphical representation of the action regarding the storage system as the input comprises receiving the graphical representation of the storage system command as an input;
wherein decoding the encoded action regarding the storage system represented by the graphical representation comprises decoding the encoded storage system command represented by the graphical representation; and
wherein performing the action regarding the storage system comprises performing the storage system command on the storage system.

12. The apparatus of claim 11
wherein decoding the encoded storage system command represented by the graphical representation generates an executable sequence of one or more storage system commands; and
wherein performing the storage system command on the storage system comprises receiving the executable sequence of one or more storage system commands via a management interface to the storage system.

13. The apparatus of claim 10
wherein determining the action regarding the storage system comprises determining a configuration of the storage system;
wherein encoding the action regarding the storage system comprises encoding the configuration of the storage system;
wherein representing the action regarding the storage system as the graphical representation comprises representing the configuration of the storage system as a graphical representation;
wherein receiving the graphical representation of the action regarding the storage system as the input comprises receiving the graphical representation of the configuration of the storage system as an input;
wherein decoding the encoded action regarding the storage system represented by the graphical representation comprises decoding the encoded configuration of the storage system represented by the graphical representation; and wherein performing the action regarding the storage system comprises configuring the storage system according to the configuration of the storage system.

14. The apparatus of claim 13 wherein the configuration of the storage system is generated by an advisory tool configured to provide one or more of capacity and performance capabilities for the storage system.

15. The apparatus of claim 10 wherein the graphical representation is a matrix barcode.

16. The apparatus of claim 10 wherein encoding the action regarding the storage system comprises encrypting the action regarding the storage system.

17. The apparatus of claim 10 wherein encoding the action regarding the storage system comprises encoding a pointer to an external storage location storing the action regarding the storage system.

18. The apparatus of claim 10 wherein performing the action regarding the storage system comprises inputting the configuration of the storage system into a form of an online purchasing system.

19. A computer program product having computer program code encoded thereon that when executed by a processor of a computer causes the computer to enable IT appliance control, the computer program code comprising:

computer program code for determining an action regarding a storage system, wherein the action is related to ongoing maintenance of the storage system;

computer program code for encoding the action regarding the storage system; and computer program code for representing the action regarding the storage system as a graphical representation;

computer program code for receiving the graphical representation of the action regarding the storage system as an input;

computer program code for decoding the encoded action regarding the storage system represented by the graphical representation; and computer program code for performing the action regarding the storage system;

wherein determining the action regarding the storage system comprises determining a configuration of the storage system;

wherein encoding the action regarding the storage system comprises encoding the configuration of the storage system;

wherein representing the action regarding the storage system as the graphical representation comprises representing the configuration of the storage system as a graphical representation;

wherein receiving the graphical representation of the action regarding the storage system as the input comprises receiving the graphical representation of the configuration of the storage system as an input;

wherein decoding the encoded action regarding the storage system represented by the graphical representation comprises decoding the encoded configuration of the storage system represented by the graphical representation; and wherein performing the action regarding the storage system comprises inputting the configuration of the storage system into a purchasing system.

20. The computer program product of claim 19 wherein performing the action regarding the storage system comprises inputting the configuration of the storage system into a form of an online purchasing system.

21. The computer program product of claim 19 wherein the configuration of the storage system is generated by an advisory tool configured to provide one or more of capacity and performance capabilities for the storage system.

* * * * *